US008458122B2

(12) United States Patent
Uchida et al.

(10) Patent No.: US 8,458,122 B2
(45) Date of Patent: Jun. 4, 2013

(54) DOCUMENT MANAGEMENT SYSTEMS, APPARATUSES AND METHODS CONFIGURED TO PROVIDE DOCUMENT NOTIFICATION

(75) Inventors: Yuki Uchida, West Caldwell, NJ (US);
Shun Tanaka, West Caldwell, NJ (US);
Kazuhiko Kato, West Caldwell, NJ (US)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 12/722,381

(22) Filed: Mar. 11, 2010

(65) Prior Publication Data
US 2011/0225501 A1    Sep. 15, 2011

(51) Int. Cl.
G06F 7/00      (2006.01)
G06F 3/00      (2006.01)
G06F 15/16     (2006.01)

(52) U.S. Cl.
USPC ............ 707/608; 715/751; 715/752; 709/206

(58) Field of Classification Search
USPC ................. 709/206, 217; 715/751; 707/608, 707/999.002, 999.009
See application file for complete search history.

(56) References Cited

U.S. PATENT DOCUMENTS

| | | | |
|---|---|---|---|
| 6,996,601 B1 * | 2/2006 | Smith | 715/762 |
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,194,433 B1 | 3/2007 | Hyakutake et al. | |
| 7,227,655 B1 | 6/2007 | Uchida et al. | |
| 7,321,867 B1 | 1/2008 | Uchida et al. | |
| 7,415,441 B1 | 8/2008 | Uchida | |
| 7,599,864 B2 | 10/2009 | Uchida et al. | |
| 7,624,045 B2 | 11/2009 | Uchida et al. | |
| 7,890,585 B2 * | 2/2011 | Lowe | 709/206 |
| 2002/0044299 A1 * | 4/2002 | Iwase et al. | 358/1.15 |
| 2003/0115326 A1 * | 6/2003 | Verma et al. | 709/225 |
| 2003/0160818 A1 * | 8/2003 | Tschiegg et al. | 345/743 |
| 2005/0050145 A1 * | 3/2005 | Lowe | 709/206 |
| 2008/0291471 A1 | 11/2008 | Uchida | |
| 2009/0276413 A1 | 11/2009 | Uchida | |
| 2010/0095354 A1 | 4/2010 | Uchida et al. | |
| 2010/0198871 A1 * | 8/2010 | Stiegler et al. | 707/783 |
| 2011/0025715 A1 | 2/2011 | Uchida et al. | |
| 2011/0173270 A1 | 7/2011 | Uchida et al. | |

OTHER PUBLICATIONS

U.S. Appl. No. 12/722,367, filed Mar. 11, 2010.
U.S. Appl. No. 12/722,370, filed Mar. 11, 2010.
U.S. Appl. No. 12/722,374, filed Mar. 11, 2010.
U.S. Appl. No. 12/722,376, filed Mar. 11, 2010.
U.S. Appl. 12/722,367, filed Mar. 11, 2010 of Yuki Uchida et al.
U.S. Appl. 12/722,370, filed Mar. 11, 2010 of Yuki Uchida et al.
U.S. Appl. 12/722,374, filed Mar. 11, 2010 of Yuki Uchida et al.
U.S. Appl. 12/722,376, filed Mar. 11, 2010 of Yuki Uchida et al.
U.S. Appl. 12/958,686, filed Dec. 2, 2010 of Shun Tanaka.
U.S. Appl. 13/014,384, filed Jan. 26, 2011 of Shun Tanaka.
U.S. Appl. 13/036,455, filed Feb. 28, 2011 of Shun Tanaka.
U.S. Appl. 13/036,558, filed Feb. 28, 2011 of Shun Tanaka.
U.S. Appl. 13/036,644, filed Feb. 28, 2011 of Shun Tanaka.
U.S. Appl. 13/036,745, filed Feb. 28, 2011 of Shun Tanaka et al.
U.S. Appl. 13/086,608, filed Apr. 14, 2011 of Shun Tanaka et al.
U.S. Appl. 13/086,779, filed Apr. 14, 2011 of Shun Tanaka et al.

* cited by examiner

Primary Examiner — Vincent F Boccio
(74) Attorney, Agent, or Firm — Cooper & Dunham LLP

(57) ABSTRACT

Apparatuses, systems and methods are provided for providing document management services to a terminal, wherein a document notification is provided to one or more notification destinations.

18 Claims, 20 Drawing Sheets

**NOTIFICATION
USER INTERFACE**

Please specify notification destination of another user:

○ *E-mail*

E-mail address: [_____]

● *Electronic Messaging*

Electronic Messaging Address/Number: [ JaneDoe9999 ]

Electronic Messaging Type: ▼
- ---
- SMS /Text
- Pager
- Messenger Program ABC
- Chat Program XYZ

[ Submit ]

| USER NOTIFICATION INFORMATION | |
|---|---|
| Document | User notification destinations |
| Document 1 | John.Smith@abc.com<br>Jane.Doe@jkl.com<br>James.Alpha@xyz.com |
| Document 2 | John.Smith@def.com |
| Document 3 | James. Sample@ |
| ... | ... |
| ... | ... |
| ... | ... |

Fig. 11B

| GROUP NOTIFICATION INFORMATION | |
|---|---|
| Document | Group notification destinations |
| Document 1 | Accounting@corporation<br>R&D@corporation |
| Document 2 | CustomerService@corpoation |
| Document 3 | Sales@corporation |
| ... | ... |
| ... | ... |
| ... | ... |

DOCUMENT MANAGEMENT SYSTEMS, APPARATUSES AND METHODS CONFIGURED TO PROVIDE DOCUMENT NOTIFICATION

TECHNICAL FIELD

This disclosure relates to systems, apparatuses and methodologies for providing document management services to a terminal, and more specifically document notifications are provided to notification destinations.

BACKGROUND

In the current information age, information technology (IT) tools for managing files and data are extensively used in enterprises and other organizations, in order to store and transfer electronic documents and data over a network.

A document management system (for example, DocumentMall) can provide users with remote access (that is, through a network) to software applications and related services that would otherwise have to be installed on the user's local computer. For example, such a document management system may be configured to store documents as electronic files in a network-connected (and secure) document storage device, in order to protect the documents from theft or loss and to avoid unnecessarily occupying storage space local to the user computer or local computing environment, while making such files available on demand. The documents may include voluminous and/or sensitive material, and may be configured to provide searchable databases of all forms of legal, medical, financial, educational, scientific, and marketing documents for individuals and/or companies via a network.

A conventional document management system typically includes an access function for a user to retrieve a document specified by the user. The corresponding document is retrieved from a document database of the document management system, and is then transmitted by the document management system to the user. FIG. 1A depicts an example of such a system 100, where client terminals 12-1 through 12-4 may access documents from a document database in a document storage part of the document management system 15, via the network 11.

There is a drawback, however, in that when a user of the document management system retrieves a document and wishes to transmit the document to another user, the user is forced to open an electronic mail program, create an email message, and find and attached the retrieved document. This procedure involves multiple steps, and may cause inconvenience to the user.

Further, there is another drawback in that documents stored at the document management system may be changed or updated by an individual, without providing notification to other individuals concerned with the document as to the changes.

There exists a need for an improved document management system which is not as difficult and time-consuming to use.

SUMMARY

This disclosure provides user interface tools (in the form of systems, apparatuses, methodologies, computer program products, etc.) for managing and accessing documents (or files).

In an aspect of this disclosure, a notification of a specified document retrieved from a document database is transmitted from an application user interface apparatus through a network to a specified notification destination, the notification including at least a portion of the document data for the specified document.

In an another aspect, a notification user interface is provided to an application user, the notification user interface configured for specification by the application user of a notification destination of another user that is different from the application user.

In another aspect, a notification transmitted from an application user through a network to a specified destination of another user includes an address for retrieving the specified document from a document database, or a URL for retrieving the specified document from the document database, where the URL includes an embedded access code that is required for accessing the specified document.

In another aspect, a document management application includes a document change monitoring part configured to monitor documents in a document database, and when the document data for a specific document in the document database has changed, push a change notification through a network to an application user interface apparatus, indicating that the specific document in the document database has changed.

In another aspect, user notification information and group notification information is maintained, and when the document data for a specific document in the document database has changed, a change notification is transmitted through the network to one or more notification destinations determined based on at least one of the user notification information and the group notification information, the notification indicating that the specific document in the document database has changed.

In another aspect, a list of accessed documents that an application user has accessed in one or more previous sessions is maintained, and if the document data of a specific document has changed, a change notification is transmitted to one or more notification destinations, the change notification indicating that the specific document in the document database has changed

BRIEF DESCRIPTION OF THE DRAWINGS

The aforementioned and other features, aspects and advantages can be more readily understood from the following detailed description with reference to the accompanying drawings wherein:

FIG. 3 shows an example of notification user interface;

FIG. 11A shows an example of user notification information;

FIG. 11B shows an example of group notification information;

DETAILED DESCRIPTION

Figure 1:
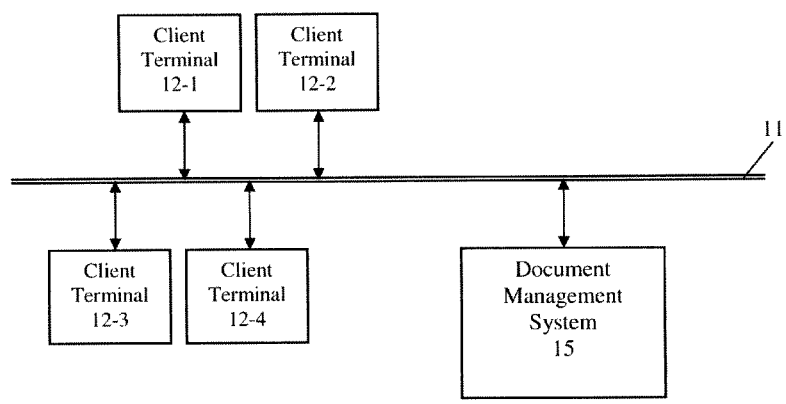
FIG. 1 shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention.

Figure 2:
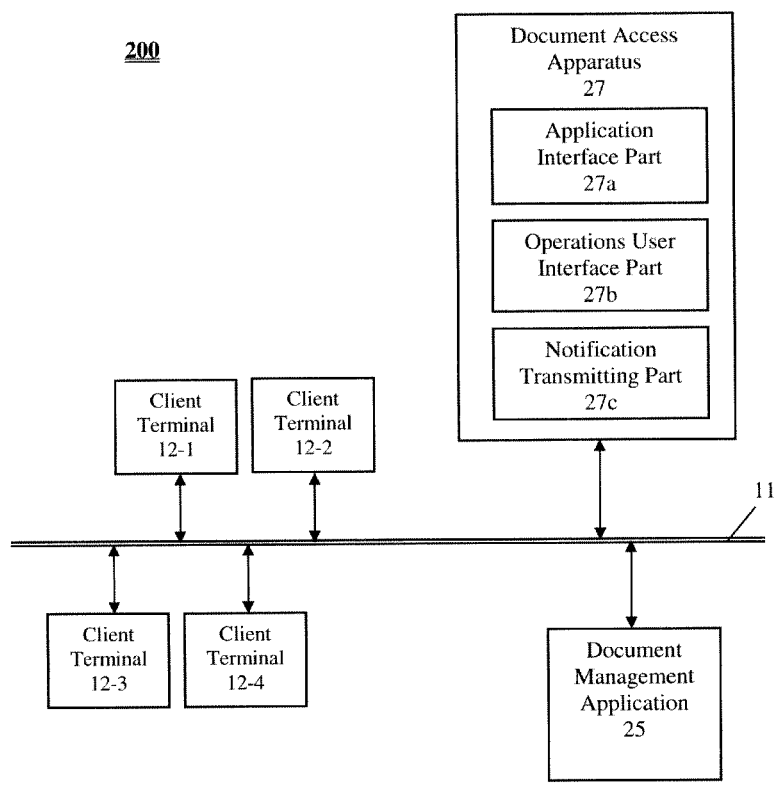
FIG. 2 shows a block diagram of a system, according to an exemplary embodiment of this disclosure.

Referring now to the drawings, wherein like reference numerals designate identical or corresponding parts throughout the several views, FIG. 2 shows schematically a system 200 for providing document management services to a terminal, according to an exemplary embodiment of this disclosure.

System 200 includes a plurality of client terminals 12-1 through 12-4, a document management apparatus 25, and a document access apparatus (or also referenced herein as "application user interface apparatus") 27, all of which are interconnected by a network 11.

The plurality of client terminals 12-1 through 12-4 may be substantially similar to those depicted in FIG. 1. In particular, the client terminals 12-1 through 12-4 are configured with software allowing the client terminals to communicate through the network 11 with at least the document access apparatus 27 and preferably also the document management apparatus 25. In particular, the client terminals 12-1 through 12-4 may transmit data to, and receive data from, the document access apparatus 27.

The document management apparatus 25 may be substantially similar to the document management system 15 depicted in FIG. 1, and may include a plurality of application functionalities. In particular, the plurality of application functions may include a document registration function to register documents in a document database of the document management apparatus 25, and an access function to retrieve a specified document (or document data for the specified document) from the document database. The document database may be storage part local to the document management apparatus 25, or may be in a storage repository connected to the document management apparatus 25 through the network 11 or through some other network. Note that the document management apparatus 25 may be realized as a "document management application" being executed on a document management apparatus or computer.

Document access apparatus 27 is configured to communicate through the network 11 with the document management apparatus 25. Document access apparatus 27 includes an application interface part 27a, an operations user interface part 27b, and a notification transmitting part 27c.

The application interface part 27a of the document access apparatus 27 is configured to communicate through the network 11 with the document management apparatus 25, to obtain document data for a specified document. That is, the application interface part 27a may communicate with the document management apparatus 25 in order to utilize the access function of the document management apparatus 25 and retrieve a document (or document data for a document), where the document is specified by an application user.

The operations user interface part 27b of the document management application 27 is configured to provide a notification user interface to an application user. The notification user interface may be provided from the document management apparatus 27 to the user (such as a user of one of the client terminals 12-1 through 12-4) via the network 11. The notification user interface is configured to allow the application user to specify a notification destination of a user that is different from the application user themselves.

An example of a notification user interface provided to an application user is depicted in FIG. 3. The notification user interface allows a user to specific a notification destination of another user. For example, if the application user wishes to specify an email address of another use as a notification destination, then the application user may select a radio button labeled "E-mail", and then type in the email address of the other user and click submit. Alternatively, if the application user wishes to specify an electronic messaging address (e.g. SMS text number, pager number, messaging service name, chat screenname, etc) of another user as the notification destination, then the user may select a radio button labeled "Electronic Messaging", type in the electronic messaging address/name/number of the other user, select the electronic message type (e.g. SMS, pager, messaging program, chat program, etc), via a pull-down menu for instance, and click submit.

The notification transmitting part 27c of the document management apparatus 27 is configured to transmit a notification of the specified document that was obtained by the application interface part 27a from the document management apparatus 25.

More specifically, the notification transmitting part 27c transmits the notification through the network 11 (or some other network) to the specified notification destination of the other user, which was specified by the application user through the notification user interface as depicted in FIG. 3. When the specified notification destination is an email address of another user, the notification is transmitted by electronic mail from the document access apparatus 27 through the network 11 to the specified email address. If the specified notification destination is an electronic messaging address of the other user, the notification is transmitted by electronic messaging from the document access apparatus 27 through the network 11 to the specified electronic messaging address of the other user.

According to this exemplary embodiment, the notification includes at least a portion of the document data for the specified document. For example, the notification may include an attachment of the document data of the specified document that was accessed by the application user. In this way, the recipient of the notification may open the attachment and obtain the document data of the specified document.

Figure 4A:
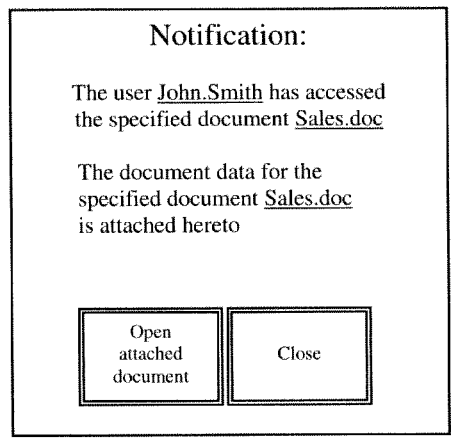
FIGS. 4A through 4D show examples of notifications.

An example of the format and content of a notification transmitted by the notification transmitting part 27c is depicted in FIG. 4A. The notification may identify the application user and the specified document accessed by the application user. The notification in the example of FIG. 4A includes an attachment of the document data of the specified document that was accessed by the application user. Thus, the notification includes at least a portion of the document data for the specified document.

Thus, according to this exemplary embodiment of this disclosure, there is provided the tools for the efficient exchange and management of documents and files. Whereas conventional techniques typically require an application user to create and draft an email message, and then find and attach to the message a previously retrieved document, if the user wishes to transmit a notification of the document (and/or the document itself) to another user, the document access apparatus of this disclosure transmits a notification of a specified document through a network to a specified notification destination of another user, the notification including at least a portion of the document data for the specified document. Hence, the operational convenience to users of the present invention is greatly increased.

The document access apparatus 27 may be embodied as a server that is distinct from the document management apparatus 25. In this way, the document access apparatus 27 may correspond to a first server, and the document management apparatus 25 may correspond to a second server separate and distinct from the first server. Hence, while conventional document management systems typically have an integrated user interface, such that any modification of the user interface would require taking the document management system offline, the document access apparatus 27 of this disclosure is configured for modification without taking the document management apparatus 25 offline.

In another aspect of this disclosure, the notification transmitted from the document access apparatus 27 through the network 11 to the specified notification destination of the other user includes a portion of the specified document (and not simply a portion of the document data of the specified document). For example, the notification may include a viewer for the recipient to view the specified document that was access by the application user.

Figure 4B:
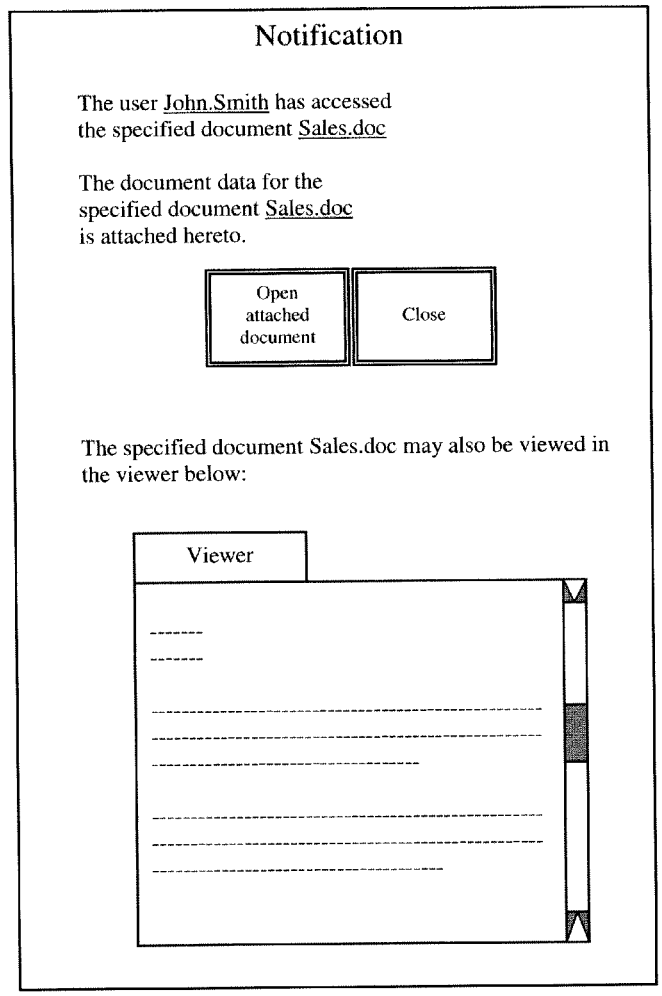

An example of such a notification is depicted in FIG. 4B. The notification in FIG. 4B is similar to that depicted in FIG. 4A, although the notification in FIG. 4B also includes a portion of the actual specified document, and a viewer for the recipient to examine the specified document that was access by the application user.

Figure 4C:
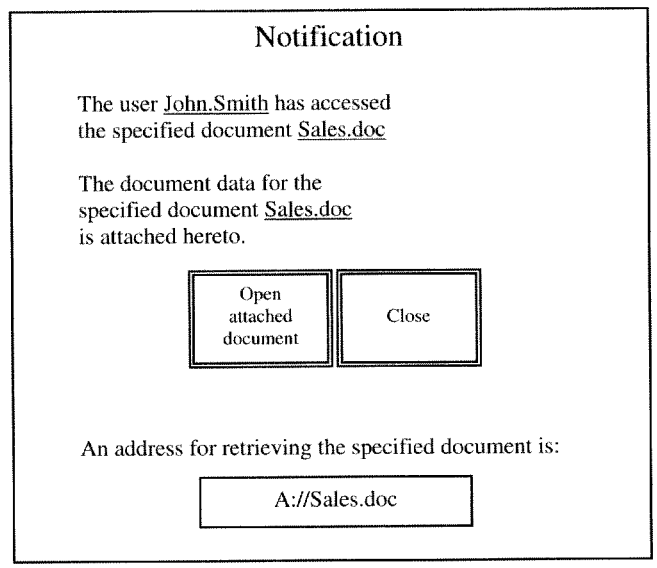

In another aspect of this disclosure, the notification transmitted from the document access apparatus 27 through the network 11 to the specified notification destination of the other user includes an address for retrieving the specified document from the document database of the document management system 25. The address may indicate a folder, directory or other location within the document database of the document management system 25 where the specified document is stored. An example of such a notification is depicted in FIG. 4C.

Figure 4D:
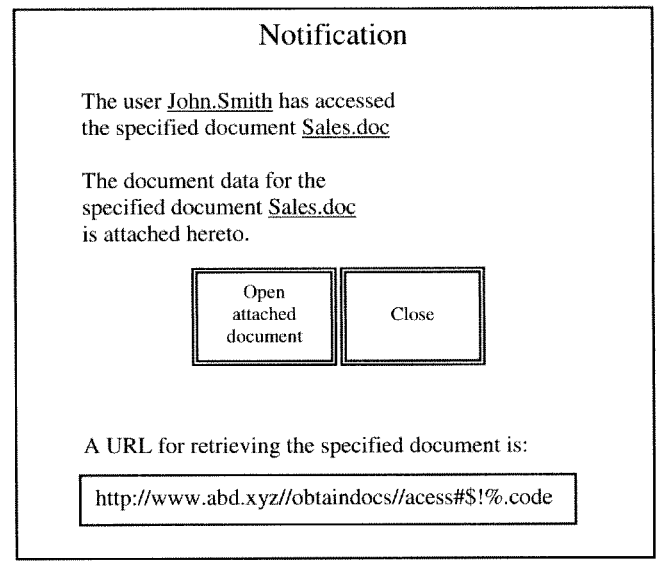

In another aspect of this disclosure, the notification transmitted from the document access apparatus 27 through the network 11 to the specified notification destination of the other user includes a URL for retrieving the specified document from the document database of the document management system 25. The URL may include an embedded access code that is required for accessing the specified document. An example of such a notification, including a URL having an embedded access code, is depicted in FIG. 4D. Note that the URL may also include parameters or commands such as GET commands for retrieving the specified document from the document database of the document management system 25.

Figure 5:
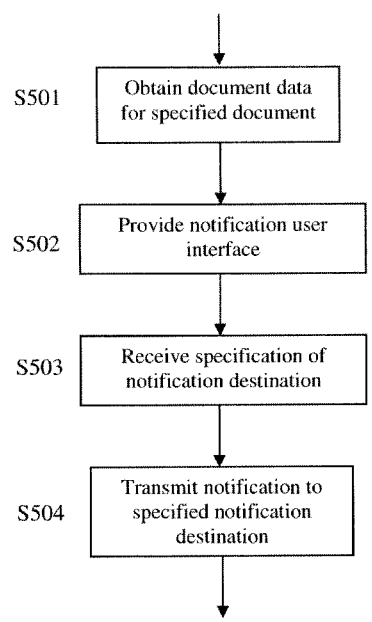
FIG. 5 shows an example of a workflow on a document access apparatus (or application user interface apparatus) side.

Turning now to FIG. 5, there is shown an example of a workflow on a document access apparatus side, such as the document access apparatus 27 in FIG. 2.

In S501, document data for a specified document is obtained from a document management apparatus, by communicating with the document management apparatus through a network. Then in S502, a notification user interface is provided to an application user. The notification interface is configured for the application user to specify a notification destination of another user that is different from the application user. An example of a notification user interface is depicted in FIG. 3.

In S503, a specification of a notification destination (in connection with the specified document) of another user that is different from the application user is received, through the notification user interface that was provided in S502. Finally, in S504, a notification of the specified document is transmitted through the network to the specified notification destination of the other user that was received in S503, wherein the notification includes at least a portion of the document data for the specified document. Examples of notifications are depicted in FIGS. 4A through 4D.

Figure 6:
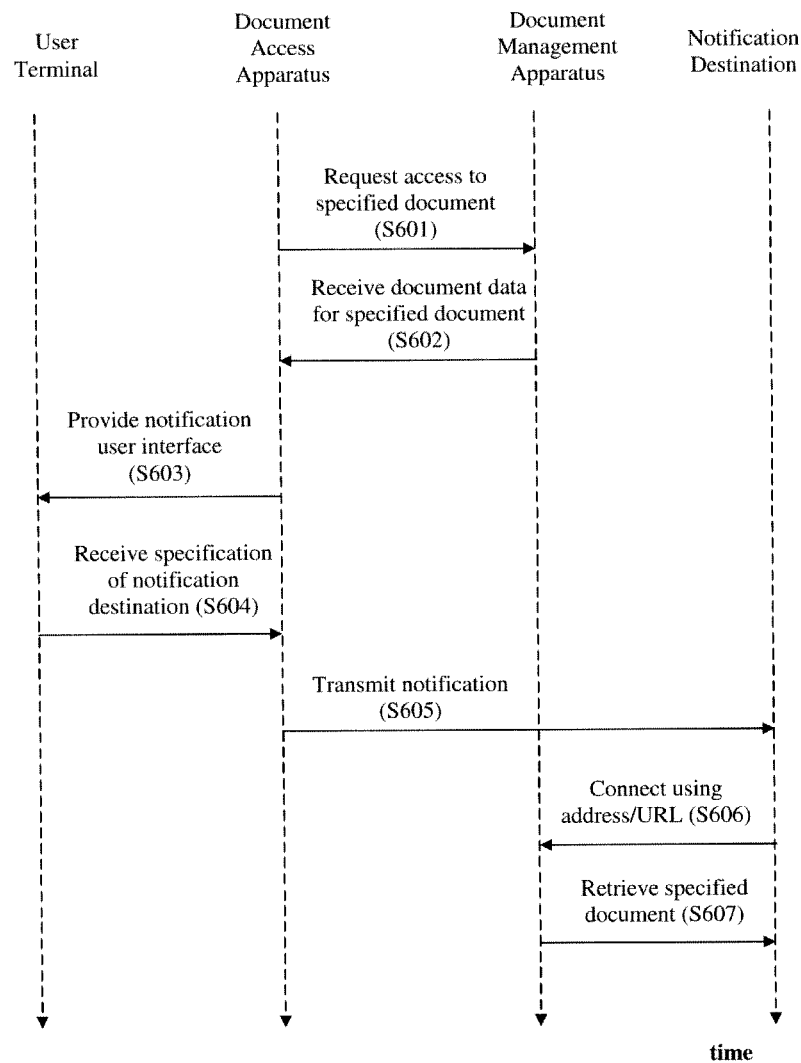
FIG. 6 shows a schematic view of an example of a data flow in an exemplary embodiment.

Turning now to FIG. 6, a schematic view of an example of data flow in an exemplary embodiment is presented.

In S601, the document access apparatus transmits a request to the document management apparatus to access a specified document. (The document may be specified by an application user of the user terminal).

In S602, document data for a specified document is received by the document access apparatus from the document management apparatus. Then in S603, a notification user interface is provided by the document access apparatus to an application user (at the user terminal). The notification user interface is configured for the application user to specify a notification destination of another user that is different from the application user. An example of a notification user interface is illustrated in FIG. 3.

In S604, a specification of a notification destination (in connection with the specified document) of another user that is different from the application user is received at the document access apparatus, from the application user via the notification user interface that was provided to the application user in S603.

Thereafter, in S605, a notification of the specified document is transmitted through the network to the specified notification destination of the other user that was received in S604, wherein the notification includes at least a portion of the document data for the specified document. Examples of notifications are depicted in FIGS. 4A through 4D.

Finally, if the notification includes an address or a URL for retrieving the specified document from the a document databases of the document management apparatus (See FIGS. 4C and 4D), then a user at the notification destination may utilize the address or the URL to connect to the document management apparatus (S606) and retrieve the specified document (S607).

Figure 7A:
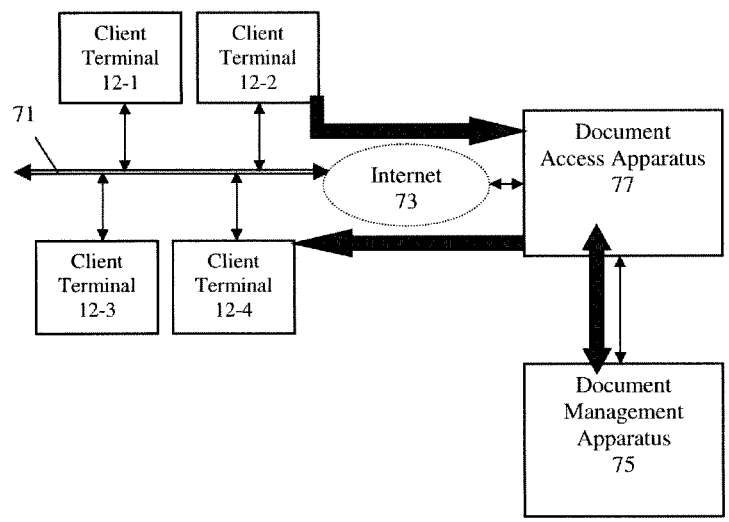
FIG. 7 shows another example of a data flow.

Aspects of the above-mentioned dataflow are also depicted in FIG. 7.

The document access apparatus 77 communicates with document management application 75, in order to access and retrieve document data for a specified document. Further, client terminal 12-2 communicates with the document access apparatus 77, in order to specify a notification destination, for example. As a result, the document access apparatus 77 connects to the notification destination, such as client terminal 12-4 in this case, in order to transmit a notification regarding the specified document to the client terminal 12-4.

Note that the system 700 depicted in FIG. 7 is similar to system 200 depicted in FIG. 2, except that system 200 in FIG. 2 shows the plurality of client terminals 12-1 through 12-4, the document access apparatus 27 and the document management apparatus 25 all directly connected to the network 11. In contrast, system 700 shows that the plurality of client terminals are directly connected to a first network 71, which may be a local area network (LAN) or intranet internal to an enterprise organization. This first network 71 is then connected to the document access apparatus 77 via a second network 73 such as the internet. The document access apparatus 77 and the document management apparatus 75 executing the document management application may be connected to each other through the internet or another network, for example.

Figure 8:
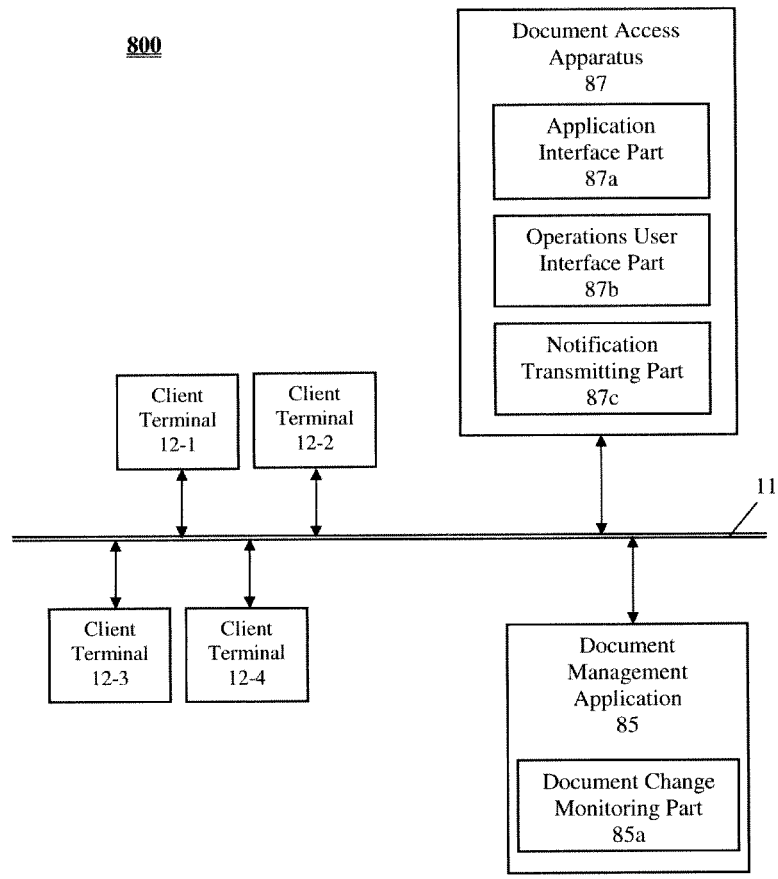
FIG. 8 shows a block diagram of a system, according to another exemplary embodiment of this disclosure.

Turning now to FIG. 8, there is shown schematically a system 800 for providing document management services to a terminal, according to another exemplary embodiment of this disclosure.

System 800 includes a plurality of client terminals 12-1 through 12-4, a document management apparatus 85, and a document access apparatus 87.

The plurality of client terminals 12-1 through 12-4 may be substantially similar to those of FIG. 2. The document access apparatus 87 may be substantially similar to the document access apparatus 27 of FIG. 2.

The document management apparatus 85 is similar to the document management apparatus 25 depicted in FIG. 2. However, the document management apparatus 85 further includes a document change monitoring part 85*a*.

The document change monitoring part 85*a* of the document management apparatus 85 is configured to monitor the documents in a document database of the document management apparatus 85. When the document data for a specific document in the document database has changed, the document change monitoring part 85*a* pushes a change notification through the network to the document access apparatus 87, the change notification indicating that the specific document in the document database has changed.

Figure 9A:
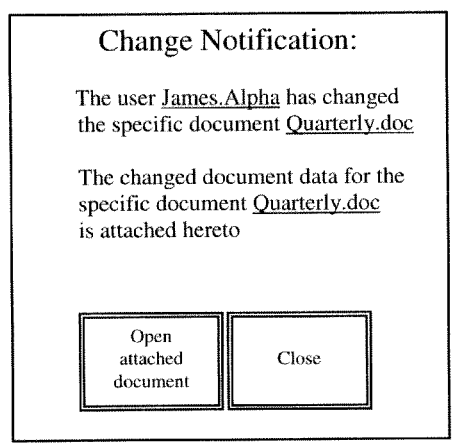
FIGS. 9A through 9D show examples of change notifications.

An example of such a change notification is depicted in FIG. 9A. The change notification in FIG. 9A may include an attachment of the document data of the specific document that was changed. Thus, the change notification may include at least a portion of the changed document data for the specific document. It is possible for the change notification to also include document data for an unchanged version of the specific document.

Figure 9B:
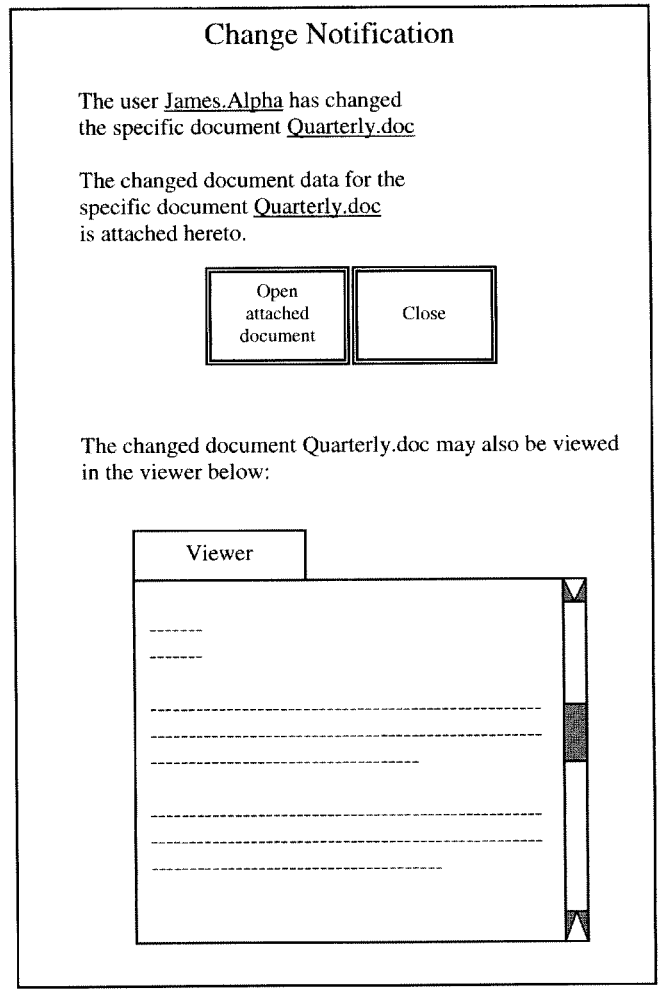

In another aspect of this disclosure, the change notification transmitted from the document management apparatus 85 through the network 11 to the document access apparatus 87 includes a portion of the specified document (and not simply a portion of the document data of the specified document). For example, the change notification may include a viewer for a user of the document access apparatus 87 view the specific document that was changed. An example of such a change notification is depicted in FIG. 9B. The change notification in FIG. 9B is similar to that depicted in FIG. 9A, although the change notification in FIG. 9B also includes a portion of the actual specific document, and a viewer for a user of the document access apparatus 87 to examine the specific document that was changed.

Figure 9C:
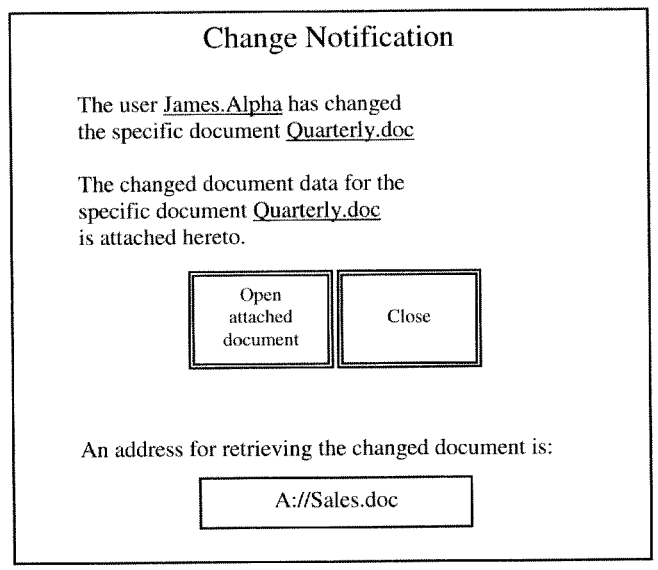

In another aspect of this disclosure, the change notification transmitted from the document management apparatus 85 through the network 11 to the document access apparatus 87 includes an address for retrieving the specific document including the changed document data from the document database of the document management system 85. The address may indicate a folder, directory or other location within the document database of the document management system 85 where the specific document and the changed document data is stored. An example of such a change notification is depicted in FIG. 9C.

Figure 9D:
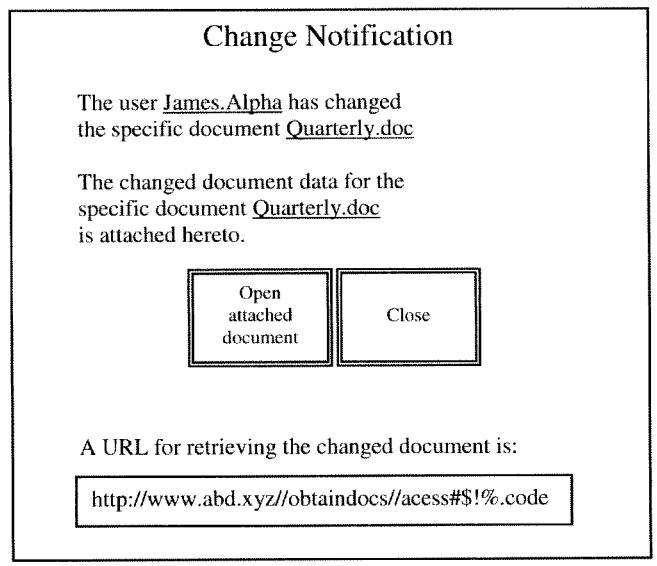

In another aspect of this disclosure, the change notification transmitted from the document management apparatus 85 through the network 11 to the document access apparatus 87 includes a URL for retrieving the specific document including the changed document data from the document database of the document management system 85. The URL may include an embedded access code that is required for accessing the specific document including the changed document data. An example of such a change notification, including a URL having an embedded access code, is depicted in FIG. 9D. Note that that URL may also include parameters or commands such as GET commands for retrieving the specified document including the changed document data from the document database of the document management system 85.

Figure 10:
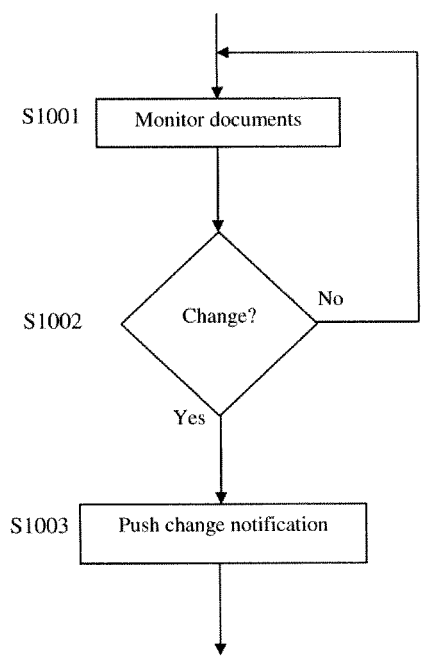
FIG. 10 shows an example of a workflow on a document management apparatus side.

Turning now to FIG. 10, there is shown an example of a workflow on a document management apparatus side, such as the document management apparatus 85 in FIG. 8.

In S1001, the document management apparatus monitors the documents, in a document database in the document management apparatus, for any changes being made to the documents. If it is determined that document data for a document has been changed (S1002, yes), then the document management apparatus pushes a change notification through a network to a document access apparatus, the change notification indicating that the specific document in the document database has changed. If it is determined that no change has been made to the document data for documents in the document database (S1002, no), the workflow returns to S1001, and the document management apparatus continues to monitor the documents in the document database for any changes.

According to another aspect of this disclosure, the document change monitoring part 85*a* of the document management apparatus 85 depicted in FIG. 8 is also configured to maintain user notification information and group notification information.

An example of user notification information is depicted in FIG. 11A. The user notification information list a plurality of documents of a document database of the document management apparatus 85, as well as user notifications destinations of users for each of the documents. Similarly, an example of group notification information is depicted in FIG. 11B. The group notification information list a plurality of documents of a document database of the document management apparatus 85, as well as group notifications destinations of groups (such as email addresses for corporate departments) for each of the documents.

According to this aspect, the document change monitoring part 85*a* of the document management apparatus 85 is configured to monitor the documents in the document database, and when the document data for a specific document in the document database has changed, transmit a change notification through the network 11 to one or more notification destinations. The notification destination may be determined based on at least one of the user notification information and the group notification information. If 'document 1' is changed, for example, then the document change monitoring part 85*a* transmits a change notification through the network to John.Smith@abc.com, Jane.Doe@jkl.com, or James.Alpha@xyz.com (as determined based on the user notification information in FIG. 11A) and/or transmits a change notification through the network to Accounting@corporation and R&D@corporation (as determined based on the group notification information in FIG.

11A). The change notification indicates that the specific document in the document database has changed, and may be similar to the change notifications depicted in FIGS. 9A-9D.

Figure 12:
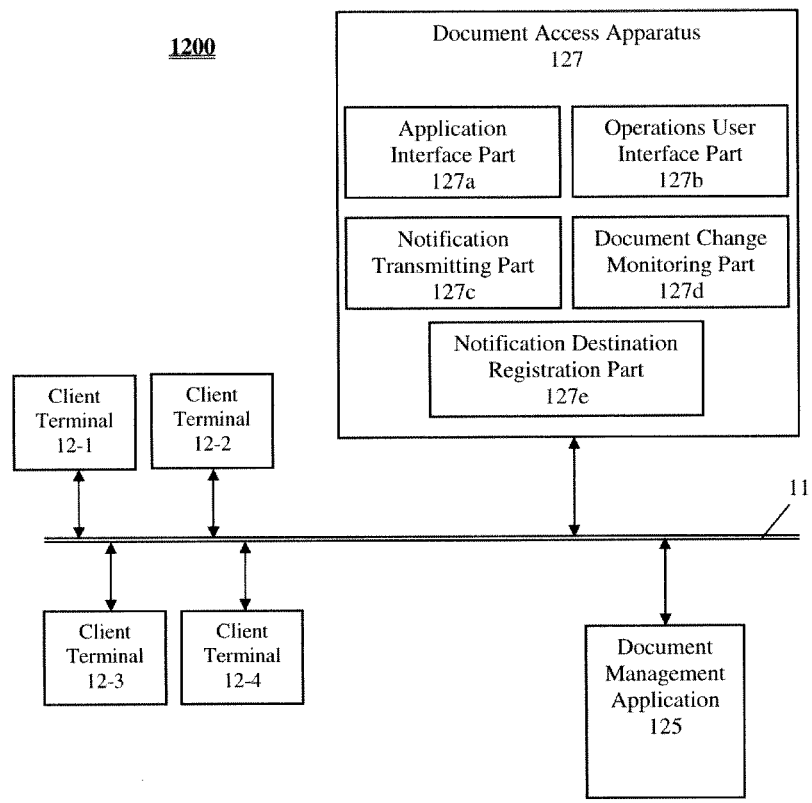
FIG. 12 shows a block diagram of a system, according to another exemplary embodiment of this disclosure.

Turning now to FIG. 12, there is shown schematically a system 1200 for providing document management services to a terminal, according to another exemplary embodiment of this disclosure.

System 1200 includes a plurality of client terminals 12-1 through 12-4, a document management apparatus 125, and a document access apparatus 127.

The plurality of client terminals 12-1 through 12-4 may be substantially similar to those of FIG. 2. The document management apparatus 125 may be substantially similar to the document management apparatus 25 of FIG. 2.

The document access apparatus 127 is similar to the document access apparatus 27 depicted in FIG. 2. In particular, the application interface part 127a, operations user interface part 127b, and notification transmitting part 127c may be substantially similar to parts 27a, 27b and 27c in FIG. 2. However, the document access apparatus 127 further includes a document change monitoring part 127d and a notification destination registration part 127e.

The document change monitoring part 127d is configured to maintain a list of accessed documents that an application user has accessed in one or more previous sessions. Further, the document change monitoring part 127d communicates with the document management apparatus 125 to determine whether the document data of specific documents in the above-mentioned list of accessed document has changed. If the document data of a specific document has changed, the document change monitoring part 127d transmits a change notification to one or more notification destinations (which may include a notification destination corresponding to the application user), the change notification indicating that the specific document in the document database has changed. Examples of change notification are depicted in FIGS. 9A through 9D.

The notification destination registration part 127e is configured to register a notification destination of another user when the notification destination of another user is specified (via the notification user interface depicted in FIG. 3, for example). Thus, the notification transmitting part 127c may transmit a data change notification to the registered notification destination of the other user when the document data for a specified document has been accessed or changed. Examples of such notifications are depicted in FIG. 9A through 9D. The specified document may be specified at the time when the notification destination of the other user is specified (via the notification user interface).

According to this exemplary embodiment, the notification user interface may be further configured for specification, by the application user, of user notification information and group notification information, as illustrated in FIGS. 11A and 11B. The notification user interface may register the user notification information and/or group notification information, and when the document data for the specified document has changed, transmit a data change notification to one or more notification destinations determined based on at least one of the user notification information and the group notification information. The data change notification indicates that the specified document in the document database has changed; examples of such notifications are depicted in FIG. 9A through 9D.

Figure 13:
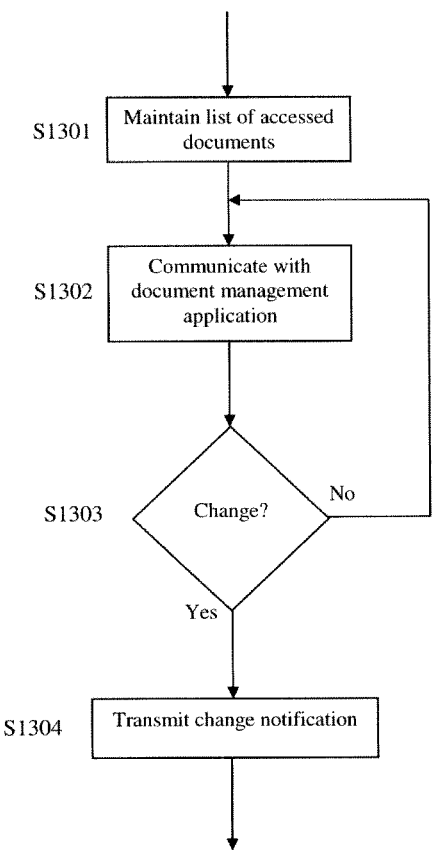
FIG. 13 shows another example of a workflow on a document access apparatus (or application user interface apparatus) side.

Turning now to FIG. 13, there is shown another example of a workflow on a document access apparatus side, such as the document access apparatus 127 in FIG. 12.

In S1301, the document access apparatus maintains a list of accessed documents that the application user has accessed in one or more previous sessions. (Note that this step is optional) In S1302, the document access apparatus communicates with a document management application to determine whether document data of documents has changed (including documents in the above-mentioned list maintained in S1301, if S1301 is performed).

If it is determined that document data for a document has been changed (S1303, yes), then the document management apparatus transmits a change notification through a network to one or more notification destinations, the change notification indicating that the specific document in the document database has changed. If it is determined that no change has been made to the document data for documents in the document database (S1303, no), the workflow returns to S1302, and the document management apparatus continues to communicate with a document management application to determine whether document data of documents has changed.

The notification destinations may include a notification destination corresponding to the application user. The notification destinations may be specified via a notification user interface, as depicted in FIG. 3, and registered in correspondence with a particular document. The notification destinations may be registered in the form of user notification information or group notification information, as depicted in FIGS. 11A and 11B.

While the examples shown in FIG. 2 and FIG. 8 and FIG. 12) include one document management apparatus, one document access apparatus and four client terminals 12-1 through 12-4, it should be appreciated that such numbers of systems, servers, apparatuses and terminals are arbitrary and are selected as an example in order to facilitate discussion, and that the subject matter of this disclosure can be implemented in a system including one or more systems, servers, apparatuses and terminals. Further, it is noted that a document access apparatus and terminal can be included in one integrated device (or of course can be separate devices). Other devices, such as scanners, printers and multi-function devices (MFDs) may also be connected to the network 11, as is well known in the art.

Each of the client terminals 12-1 through 12-4 can be any computing device, including but not limited to a personal, notebook or workstation computer, a kiosk, a PDA (personal digital assistant), a MFD (multi-function device), a server, a mobile phone or handset, another information terminal, etc., that can communicate through the network 11 with other devices.

While four client terminals 12-1 through 12-4 are depicted in FIG. 2, it should be understood that system 200 can include any number of client terminals (which can have similar or different configurations) connected to the network 11.

The document access apparatuses can be configured in software or hosted on any computing device, including but not limited to a personal, notebook or workstation computer, a kiosk, a PDA (personal digital assistant), a MFD, a server, a mobile phone or handset, another information terminal, etc., that can communicate through the network 11 with other devices.

The document access apparatuses of this disclosure may be realized by a computer program product including a computer-usable, non-transient medium (such as a disk storage apparatus) having instructions tangibly embodied therein that are executed by a computer.

Thus, it should be understood that document access apparatus may be executed on a computer. While document access apparatuses are shown as being external to the client terminals 12-1 through 12-4, the document access apparatus 27 (and 87 and 127) may in fact be executed on one of the client terminals 12-1 through 12-4.

The document management apparatus may include a data store that can comprise one or more structural or functional parts that have or support a storage function. For example, the data store can be, or can be a component of, a source of electronic data, such as a document access apparatus, a back-end server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The document management application may be realized as a computer program product including a computer-usable, non-transient medium (such as a disk storage apparatus) having instructions tangibly embodied therein that are executed by a computer, such as a document management apparatus.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 14:
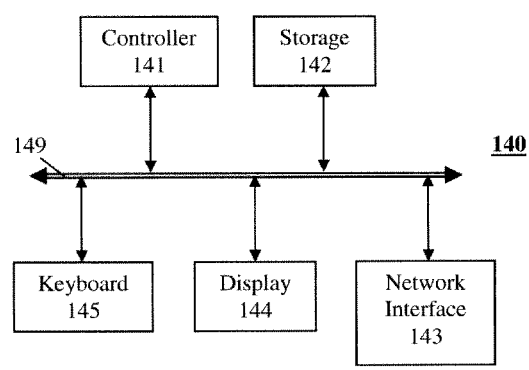
FIG. 14 shows a block diagram of an exemplary configuration of a document access apparatus (or application user interface apparatus)

FIG. 14 shows an exemplary constitution of a document access apparatus 140 as a computer, for example, that can be configured through software to provide the document access apparatus 27 of FIG. 2 (or document access apparatus 87 or 127). As shown in FIG. 14, the document access apparatus 140 includes a controller (or central processing unit) 141 that communicates with a number of other components, including memory or storage part 142, network interface 143, display 114 and keyboard 145, by way of a system bus 149.

The document access apparatus 140 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as would be appreciated by those skilled in the relevant arts.

In document access apparatus 140, the controller 141 executes program code instructions that control conferencing apparatus operations. The controller 141, memory/storage 142, network interface 143, display 144 and keyboard 145 are conventional, and therefore in order to avoid occluding the inventive aspects of this disclosure, such conventional aspects are not discussed in detail herein.

The document access apparatus 140 includes the network interface 143 for communications through a network, such as communications through the network 11 with the client terminals 12-1 through 12-4 and document management apparatus 25 in FIG. 2. However, it should be appreciated that the subject matter of this disclosure is not limited to such configuration. For example, the document access apparatus may communicate with the client terminals 12-1 through 12-4 and document management apparatus 25 through direct connections and/or through a network to which some components are not connected. As another example, the document access apparatus need not be provided by a server that services terminals, but rather may communicate with the terminals on a peer basis, or in another fashion.

As mentioned above, document access apparatus 27 (and 87) are not limited to a server or computer, but can be manifested in any of various devices that can be configured to communicate over a network and/or the Internet.

Note that one or more of the user interfaces (such as the registration user interface or the operations user interface) may be provided as web services through the network to the client terminal.

Figure 15:
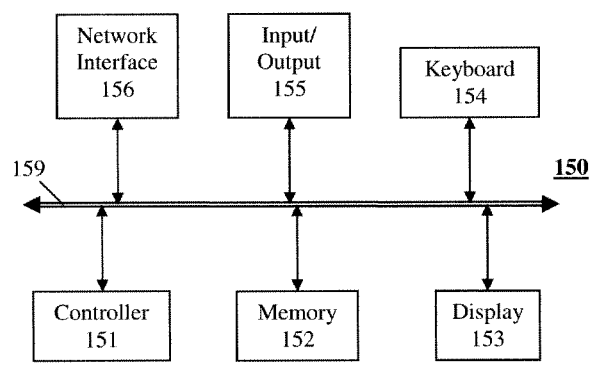
FIG. 15 shows a block diagram of an exemplary configuration of a client terminal.

An example of a configuration of one of the plurality of client terminals 12-1 through 12-4 (for example, as a computer) is shown schematically in FIG. 15. In FIG. 15, computer 150 includes a controller (or central processing unit) 151 that communicates with a number of other components, including memory 152, display 153, keyboard (and/or keypad) 154, other input/output (such as mouse, touchpad, stylus, microphone and/or speaker with voice/speech interface and/or recognition software, etc.) 155, and network interface 156, by way of internal bus 159.

The memory 152 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 156 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the client terminal and/or via the network, interact with network-connected devices and services (such as the document management apparatus 25), enjoy other software-driven functionalities, etc. For example, a browser (such as Internet Explorer™, Netscape Navigator™, a proprietary browser, etc.) may be provided on the client terminal so that a user of the client terminal can use browsing operations to communicate with the document management apparatus 25, and access other data or content.

Additional aspects or components of the computer 120 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, each of the client terminals 12-1 through 12-4 is not limited to a personal computer, but can be manifested in a form of any of various devices that can be configured to communicate over a network and/or the Internet.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A system for providing document management services to a terminal, said system comprising:
    (a) a document management application embodied in a non-transitory medium and including instructions executable by a computer to provide a plurality of application functions, the plurality of application functions including a document registration function to register documents in a document database, and an access function to retrieve a specified document, or document data for the specified document, from the document database; and
    (b) an application user interface apparatus configured to communicate through a network with the document management application, the application user interface apparatus including a non-transitory storage medium embodying instructions which, when executed, configure the application user interface apparatus to include:
        an application interface part configured to communicate through the network with the document management application, to obtain document data for the specified document;
        an operations user interface part configured to provide to the application user a notification user interface configured for specification, by the application user, of a notification destination of another user that is different from the application user; and
        a notification transmitting part configured to transmit a notification, indicating that the specified document has been accessed by the application user, from the application user interface apparatus through the network to the specified notification destination of said another user, the notification including at least a portion of the document data for the specified document,
    wherein the notification transmitted by the notification transmitting part includes a document viewer displaying at least a viewable portion of the specified document accessed by the application user.

2. The system of claim 1, wherein the notification transmitted from the application user interface apparatus through the network to the specified notification destination of said another user includes an address for retrieving the specified document from the document database.

3. The system of claim 1, wherein the notification transmitted from the application user interface apparatus through the network to the specified notification destination of said another user includes a URL for retrieving the specified document from the document database, and the URL includes an embedded access code that is required for accessing the specified document.

4. The system of claim 1, wherein the specified notification destination is an email address of said another user, and the notification is transmitted by electronic mail from the application user interface apparatus through the network to the specified email address of said another user.

5. The system of claim 1, wherein the specified notification destination is an electronic messaging address of said another user, and the notification is transmitted by electronic messaging from the application user interface apparatus through the network to the specified electronic messaging address of said another user.

6. The system of claim 1, wherein the document management application includes:
    a document change monitoring part configured to monitor the documents in the document database, and when the document data for a specific document in the document database has changed, pushes a change notification through the network to the application user interface apparatus, indicating that the specific document in the document database has changed.

7. The system of claim 6, wherein the change notification transmitted from the document management application through the network to the application user interface apparatus includes at least a portion of the changed document data for the specific document.

8. The system of claim 6, wherein the change notification transmitted from the document management application through the network to the application user interface apparatus includes an address for retrieving the specific document including the changed document data from the document database.

9. The system of claim 6, wherein the change notification transmitted from the document management application through the network to the application user interface apparatus includes a URL for retrieving the specific document including the changed document data from the document database, and the URL includes an embedded access code that is required for accessing the specific document including the changed document data.

10. The system of claim 1 wherein the document management application includes:
    a document change monitoring part configured to monitor the documents in the document database, maintain user notification information and group notification information, and when the document data for a specific document in the document database has changed, transmit a change notification through the network to one or more notification destinations determined based on at least one of the user notification information and the group notification information, the notification indicating that the specific document in the document database has changed.

11. A document access apparatus configured to access a document management application, including a plurality of application functions, through a network, the plurality of application functions including a document registration function to register documents in a document database, and an access function to retrieve a specified document, or document data for the specified document, said document access apparatus comprising a non-transitory storage medium embodying instructions executable to configure the document access apparatus to include:
    an application interface part configured to communicate through the network with the document management application, to obtain document data for the specified document;
    an operations user interface part configured to provide to an application user a notification user interface configured for specification, by the application user, of a notification destination of another user that is different from the application user, in connection with the specified document; and
    a notification transmitting part configured to transmit a notification, indicating that the specified document has been accessed by the application user, through the network to the specified notification destination of said another user, the notification including at least a portion of the document data for the specified document, wherein the notification transmitted by the notification transmitting part includes a document viewer displaying at least a viewable portion of the specified document accessed by the application user.

12. The document access apparatus of claim 11, wherein the notification of the specified document is transmitted when the notification destination of said another user is specified by the application user through the notification user interface.

13. The document access apparatus of claim 11, further comprising:
a document change monitoring part configured to maintain a list of accessed documents that the application user has accessed in one or more previous sessions, communicate with the document management application to determine whether the document data of specific documents in the list has changed, and if the document data of a specific document has changed, transmit a change notification to one or more notification destinations, the change notification indicating that the specific document in the document database has changed.

14. The document access apparatus of claim 11, further comprising:
a notification destination registration part configured to register the notification destination of said another user when the notification destination of said another user is specified,
wherein the notification transmitting part transmits a data change notification to the registered notification destination of said another user when the document data for the specified document has changed.

15. The document access apparatus of claim 11, wherein the notification user interface is further configured for specification, by the application user, of user notification information and group notification information, register the user notification information and group notification information, and when the document data for the specified document has changed, transmit a data change notification to one or more notification destinations determined based on at least one of the user notification information and the group notification information, the notification indicating that the specified document in the document database has changed.

16. The document access apparatus of claim 11, wherein the notification transmitted by the notification transmitting part to the specified notification destination includes an address for retrieving the specified document from the document database.

17. The document access apparatus of claim 11, wherein the notification transmitted by the notification transmitting part to the specified notification destination includes a URL for retrieving, the specified document from the document database, and the URL includes an embedded access code that is required for accessing the specified document.

18. A method for providing document management services via a document management application, including a plurality of application functions, to a terminal, the plurality of application functions including a document registration function to register documents in a document database, and an access function to retrieve a specified document, or document data for the specified document, said method comprising the steps of:
communicating by an application user interface apparatus through the network with the document management application, to obtain document data for the specified document;
providing by the application user interface apparatus to an application user a notification user interface, and receiving through the notification user interface, specification of a notification destination of another user that is different from the application user, in connection with the specified document; and
transmitting, by a notification transmitting part of the application user interface apparatus, a notification, indicating that the specified document has been accessed by the application user, from the application user interface apparatus through the network to the specified notification destination of said another user,
wherein the notification transmitted by the notification transmitting part includes a document viewer displaying at least a viewable portion of the specified document accessed by the application user.

* * * * *